(12) United States Patent
West et al.

(10) Patent No.: US 9,128,189 B1
(45) Date of Patent: Sep. 8, 2015

(54) HYBRID PULSED-FMCW MULTI-MODE AIRBORNE AND ROTARY WING RADAR ESA DEVICE AND RELATED METHOD

(71) Applicant: Rockwell Collins, Inc., Cedar Rapids, CA (US)

(72) Inventors: James B. West, Cedar Rapids, IA (US); Daniel L. Woodell, Cedar Rapids, IA (US); Lee M. Paulsen, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 310 days.

(21) Appl. No.: 13/684,920

(22) Filed: Nov. 26, 2012

(51) Int. Cl.
  *G01S 13/32* (2006.01)
  *G01S 13/93* (2006.01)
  *G01S 13/02* (2006.01)
  *G01S 7/32* (2006.01)
  *G01S 13/44* (2006.01)

(52) U.S. Cl.
  CPC . *G01S 13/93* (2013.01); *G01S 7/32* (2013.01); *G01S 13/4463* (2013.01); *G01S 2013/0254* (2013.01)

(58) Field of Classification Search
  CPC .............. G01S 13/4463; G01S 7/032; G01S 2013/0254; G01S 13/93
  USPC .................................. 342/26 B, 29, 153, 156
  See application file for complete search history.

(56) References Cited

U.S. PATENT DOCUMENTS

| | | | | |
|---|---|---|---|---|
| 4,766,437 | A * | 8/1988 | Schmidt et al. | 342/368 |
| 6,618,008 | B1 * | 9/2003 | Scholz | 342/427 |
| 7,239,266 | B2 * | 7/2007 | Vacanti | 342/120 |
| 8,633,851 | B2 * | 1/2014 | Vacanti et al. | 342/149 |
| 2013/0113651 | A1 * | 5/2013 | Leise et al. | 342/146 |

* cited by examiner

*Primary Examiner* — John B Sotomayor
*Assistant Examiner* — Marcus Windrich
(74) *Attorney, Agent, or Firm* — Angel N. Gerdzhikov; Donna P. Suchy; Daniel M. Barbieri (57) ABSTRACT

A device and method is disclosed for a hybrid multi-mode airborne and rotary wing radar Electronically Scanned Antenna (ESA). Pulsed Radio Frequency Integrated Circuit (RFIC) Transmit and Receive Modules (TRM) are nested with Frequency Modulated Continuous Wave (FMCW) transmit elements within the aperture of an ESA. FMCW elements only transmit while the pulsed TRM receive both the pulsed return and the FMCW return. During the hybrid configuration, both the pulsed and FMCW performance is limited to less than the full ESA aperture. In an alternate configuration, individual TRM are configured for transmit and receive of both FMCW and pulsed signals are coupled within the aperture of the ESA. The individual elements offer full aperture performance in both pulsed and FMCW operation. A diplexer controls channel deconfliction between the pulsed and the FMCW transmissions/receptions while a switching network directs the individual elements to hop between the pulsed and FMCW modes.

24 Claims, 12 Drawing Sheets

HYBRID PULSED-FMCW MULTI-MODE AIRBORNE AND ROTARY WING RADAR ESA DEVICE AND RELATED METHOD

FIELD OF THE INVENTION

The present invention relates generally to airborne radar devices. More particularly, embodiments of the present invention relate to a hybrid pulsed and continuous wave multi-mode airborne electronically scanned array.

BACKGROUND OF THE INVENTION

Pulsed radar may be optimally suited for meteorological phenomenon detection, such as rain, turbulence, wind shear, etc. However, for non-weather modes of operation, pulsed radar may have certain limitations concerning minimum range restrictions due to the two-way radar-to-target pulsed format and radar-to-target-to-radar propagation time. Continuous wave radar or Frequency Modulated Continuous Wave (FMCW) may be well suited to close range and moving target reception due to the continuous wave and detail resolution nature of the signal.

A radar system employing an Active Electronically Scanned Antenna (AESA) may be beneficial to users as the size weight power and cost (SWP-C) of such antenna arrays are increasingly efficient for incorporation by the operator.

Radar application modes of critical importance to an operator may include aircraft low visibility taxi operation including operations suited for Surface Movement Guidance and Control System (SMGCS) standards. In such an environment, an operator may be required to monitor and maintain clearance in the area 200-300 feet in front of the operators own aircraft position. Goals of aircraft operators may include a non-cooperative collision avoidance system for such short range threats and an ability for an aircraft to image or perceive close in obstacles i.e., taxiway lights, runway lights and signage, other aircraft and the like. A Radar Cross Section (RCS) on the order of one square meter (1 $m^2$) may be a desired target size for an onboard radar system to image. Additional goals of an onboard system may include an ability to accurately image such a 1 $m^2$ target within 300 feet at a speed of 20 knots (kts) as the target makes a 90 degree turn. Traditional FMCW radar may be better suited for these shorter range goals.

Additionally, challenges remain for operators of a rotary wing aircraft to image such short range targets. A short range capability (e.g. less than 100 feet of range) may enable a rotary wing aircraft to navigate in situations previously prohibited (e.g., sand storms, low visibility launch/recovery operations). Also, during low altitude operations, an ability to image an obstacle, a terrain feature, or a station keeping reference point may enhance rotary wing low altitude capabilities. In these situations, traditional radar may experience "brownout" or a return of unusable significance to an operator due to particular atmospheric conditions. Traditionally, a FMCW radar may be better suited for such a short range solution than would be a pulsed radar.

Previous attempts of solving the problems described above may include Laser Radar (LIDAR) and infrared (IR) systems attempting to image an obstacle or target through a certain atmospheric condition. Both of these attempts may suffer from propagation loss sue to an inability to penetrate the particular atmospheric condition (e.g., blowing sand).

FMCW, however, has limitations considering long range radar solutions for imaging small RCS target (e.g. small aircraft, weather) detection. Pulsed radar may provide a better picture of longer range contacts.

Mounting two types of radar on an airframe may be prohibitively expensive and may be too heavy for adequate performance. A well-known pulsed radar mounted on the forward nose of an aircraft may contribute a significant portion to the overall weight and internal volume of the aircraft. An additional FMCW radar mounted to the same aircraft may encumber electrical and thermal management systems, challenge designers for proper placement, and negatively impact performance.

Multi-chip modes of semiconductor dies may be well-known in the art of semiconductor technology. Semiconductor chips have been organized and placed in a variety of geometries and stacks as mounted on a circuit board substrate. However, the use of Multi-chip modes to overcome the challenges herein has yet to be realized.

Consequently, a need exists for development of an AESA-based hybrid system able to merge pulsed and FMCW elements into a single AESA antenna system specifically capable to solve both short range and long range solutions.

SUMMARY OF THE INVENTION

Accordingly, an embodiment of the present invention is directed to a hybrid pulsed and Frequency Modulated Continuous Wave (FMCW) radar antenna device, comprising: an Electronically Scanned Array (ESA) antenna, the ESA having an aperture, the ESA further comprising: an array of pulsed Transmit Receive Modules (TRM) within the aperture, each pulsed TRM configured for transmitting pulsed radar signals and further configured for receiving pulsed radar signals and receiving FMCW radar signals, and at least one FMCW transmitter element configured within the aperture, the FMCW transmitter configured for transmitting FMCW radar signals, wherein a receive path is configured to carry received FMCW radar signals and received pulsed radar signals from each TRM to a radar receiver.

A further embodiment of the present invention is directed to a hybrid pulsed and Frequency Modulated Continuous Wave (FMCW) radar antenna device comprising: an Electronically Scanned Array (ESA) antenna, the ESA having an aperture, the ESA further comprising: an array of hybrid pulsed and FMCW elements within the aperture, each of the hybrid pulsed and FMCW elements configured for transmit and receive of a pulsed signal and transmit and receive of a FMCW signal, a diplexer configured for separating a FMCW channel from a pulsed channel, and a switching network configured for switching between a pulsed mode and a FMCW mode, wherein a full aperture is available for the hybrid pulsed and FMCW elements transmitting and receiving in either the pulsed mode or the FMCW mode.

An additional embodiment of the present invention is directed to a method for transmission and reception of pulsed and Frequency Modulated Continuous Wave (FMCW) radar energy from and to a single antenna, comprising: coupling an array of pulsed Transmit Receive Modules (TRM) to an Electronically Scanned Array (ESA) antenna, the ESA having an aperture, each pulsed TRM configured for transmitting pulsed radar signals and further configured for receiving pulsed radar signals and for receiving FMCW radar signals, the pulsed TRM coupled to the ESA within the aperture, coupling at least one FMCW transmitter element to the ESA antenna within the aperture, transmitting FMCW signals from the at least one FMCW transmitter element, the transmitting through less than a full aperture, transmitting pulsed radar signals from the array of pulsed TRM, the transmitting through less than a full aperture, receiving FMCW radar returns and pulsed radar returns from a target, and displaying symbols to an operator on a display, the symbols based on the received FMCW and pulsed radar returns.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention are directed to a system that merges FMCW and pulsed radars into a single aperture able retain the advantages of each individual system while mitigating the disadvantages of each across the target regime. Embodiments of the present invention may utilize a Silicon Germanium (SiGe) Radio Frequency Integrated Circuit (RFIC) Transmit/Receive module (TRM) based AESA to realize a hybrid pulsed/FMCW system. This shared asset AESA may present simultaneous pulsed and FMCW modes able to realize the complementary strengths of each type of radar signal.

An additional goal of the present invention may include architecture such that a directional receive beam resolves ambiguities in TX FMCW grating lobes.

An additional goal of the present invention may include an RF transceiver architecture to allow for common pulsed FMCW receiver chain.

A further goal of the present invention may include an RF transverse with diplexing to allow FMCW operation with standard pulsed Tx/Rx signal paths architecture.

An additional goal of the present invention may include a super regenerative receiver concept for two-panel chevron ESA to extend FMCW range.

A further goal of the present invention may include diplexing of slightly different carrier frequencies for the pulsed and FMCW modes enabling simultaneous mode operation.

Figure 1:
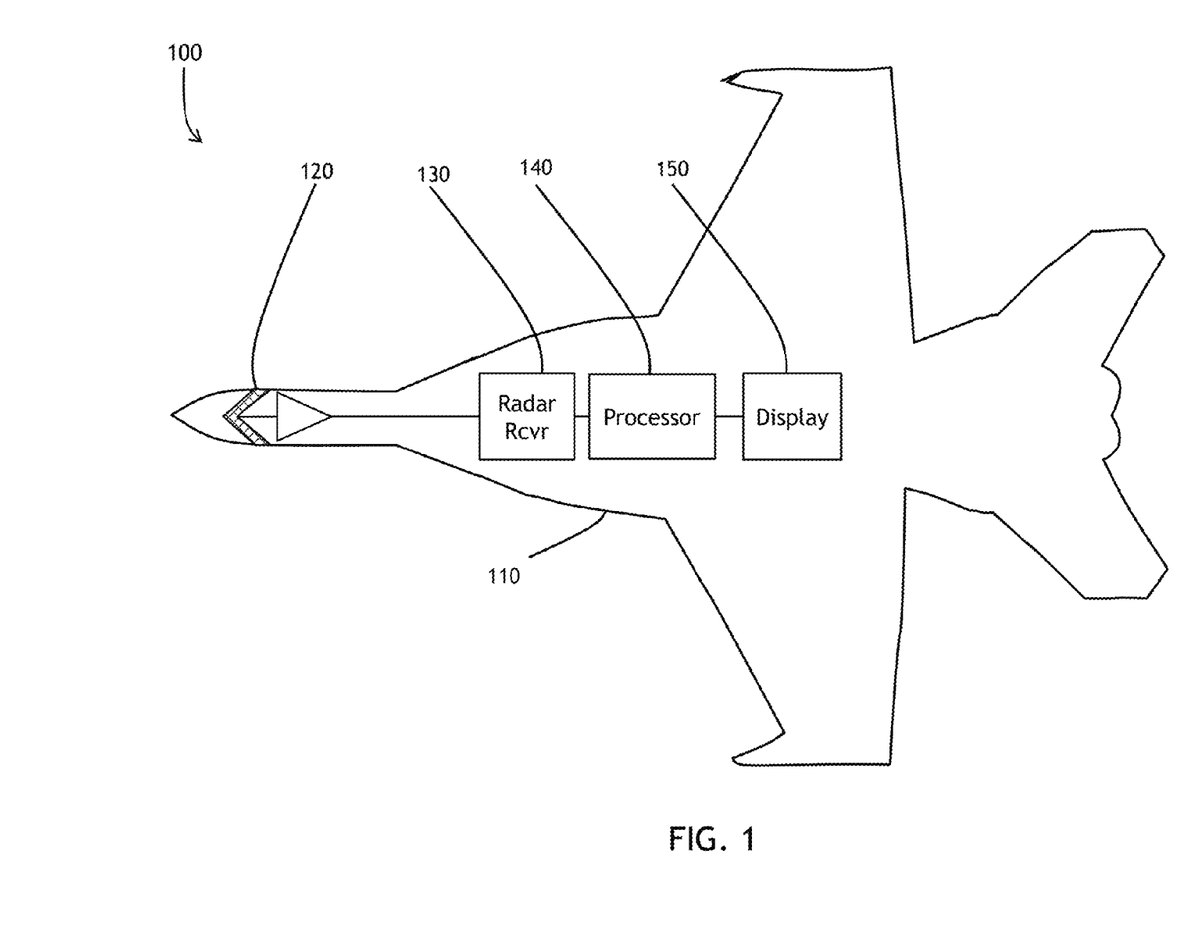
FIG. 1 is an overview of a hybrid pulsed-FMCW multi-mode airborne and rotary wing radar ESA in accordance with a preferred embodiment of the present invention.

Referring to FIG. 1, an overview of a hybrid pulsed-FMCW multi-mode airborne and rotary wing radar ESA in accordance with a preferred embodiment of the present invention is shown. System 100 may include ESA radar 120 as the transmit and receive source for the overall system 100. Radar receiver 130 may receive both FMCW and pulsed signals from ESA antenna 120. Processor 140 may receive signals from the radar receiver 130 and process the signals for output. One output for the processed signals may include display 150 configured for display of symbols for an operator.

Embodiments of the present invention may include single or multiple radiating FMCW TRM interlaced within pulsed radar AESA aperture radiating elements creating a hybrid architecture. Preferable implementation may include a single radiating element, a linear type column or row array configuration, a two dimensional subarray element (the subarray being a section of a full aperture) interlaced within a pulsed radar ESA aperture, and a full aperture. In addition, a well-known Monopulse FMCW mode radar system may be specially configured with RFIC modules of the present invention to provide a coordinated system.

Preferably, embodiments of the present invention may use architecture configured with parallel and separate FMCW signal chain in concert with and relative to the pulsed radar system, all within a common ESA aperture. One embodiment may include a classic FMCW superhet or homodyne transceiver embodied within a SiGe RFIC module. An additional embodiment may include local independent FMCW transmitters with an exciter signal derived from a common pulsed/FMCW exciter chain. In this aspect, one implementation may include the same receive chain for pulsed as well as FMCW in order to minimize receiver RFIC count.

Figure 2:
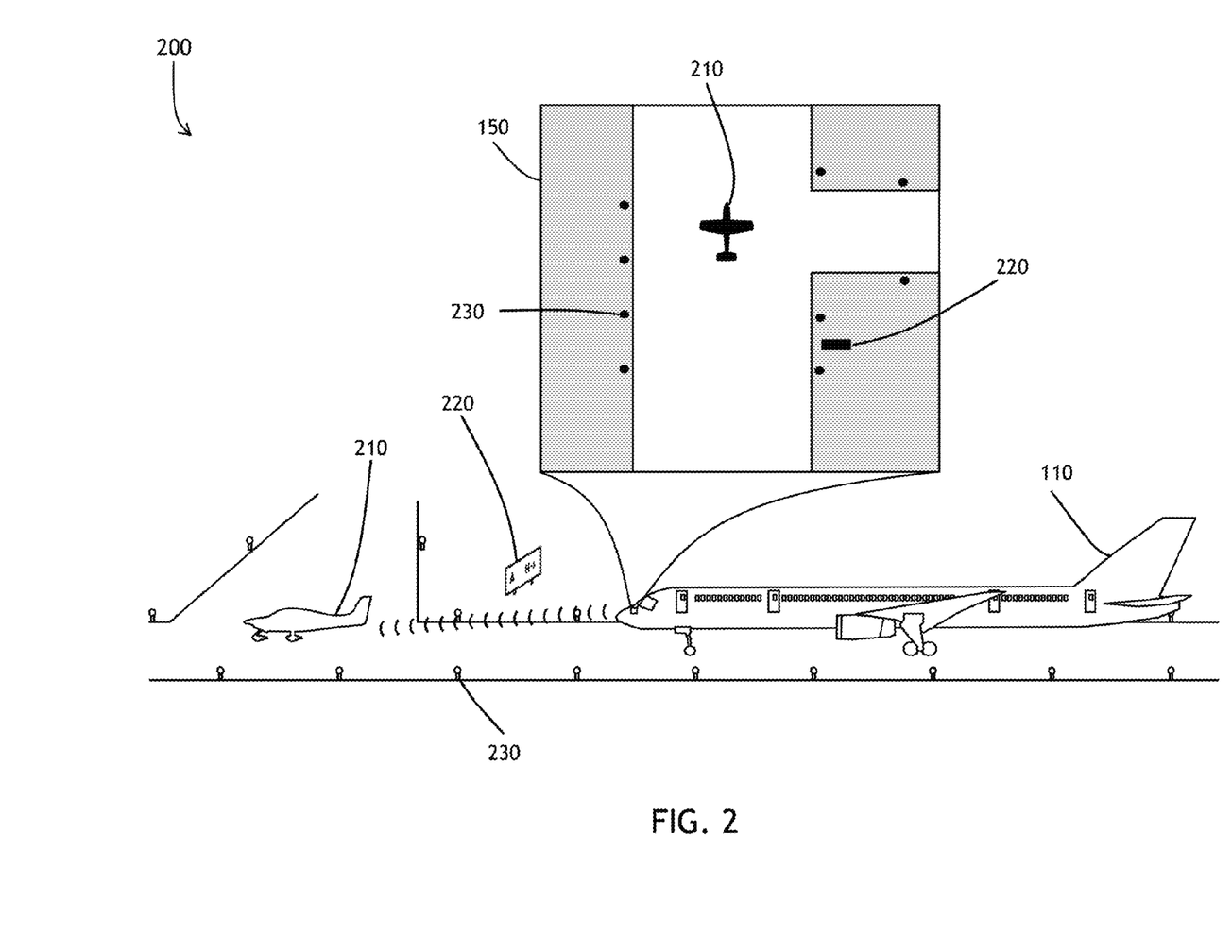
FIG. 2 is a diagram of the hybrid pulsed-FMCW multi-mode radar implemented in aircraft taxi operations in accordance with preferred embodiment of the present invention.

Referring to FIG. 2, diagram of the hybrid pulsed-FMCW multi-mode radar implemented in aircraft taxi operations in accordance with preferred embodiment of the present invention is shown. In one implementation of the present invention, aircraft 110 may image surrounding obstacles at a 200-300 feet range with system 200 of the hybrid radar installed. Obstacles may include small aircraft 210, taxiway signage 220 and taxiway lights 230. In a low visibility environment, operator of aircraft 110 may be able to successfully taxi aircraft 110 solely using system 200. Imaged obstacles may be indicated to operator on display 150.

Figure 3:
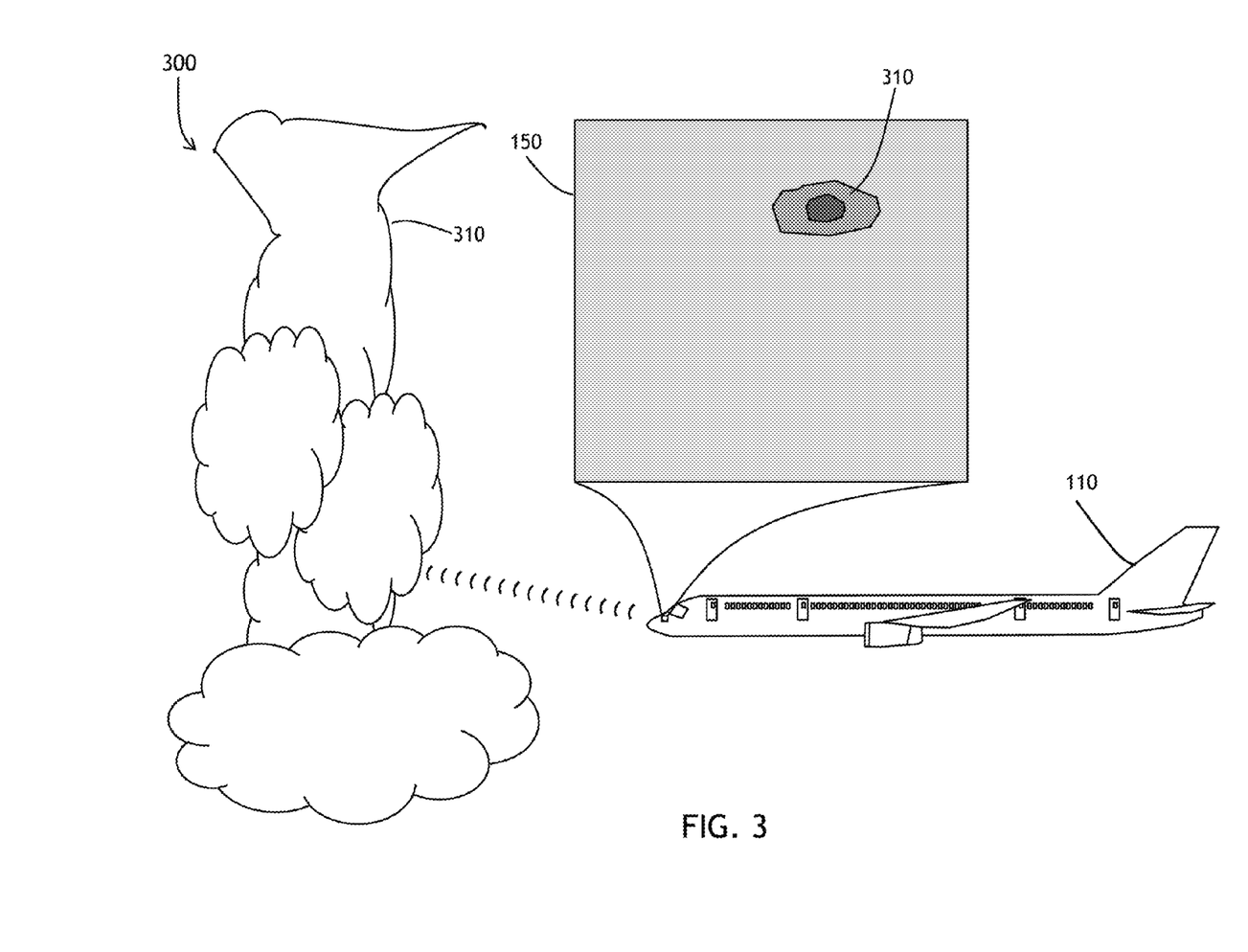
FIG. 3 is a diagram of the hybrid pulsed-FMCW multi-mode radar implemented in aircraft weather avoidance operations in accordance with a preferred embodiment of the present invention.

Referring to FIG. 3, diagram of the hybrid pulsed-FMCW multi-mode radar implemented in aircraft weather avoidance operations in accordance with a preferred embodiment of the present invention is shown. Aircraft 100 may use the installed hybrid ESA radar to image thunderstorm 310 at range and display to an operator on display 150.

Embodiments of the present invention may be immune to attenuation from airborne particulate matter. The naturally low RCS of sandy clutter may challenge a traditional radar system. Skilled artisans may recognize a typical sandstorm may possess an RCS value of approximately −20 dBσ and may be as low as −50 dBσ. A traditional radio altimeter may experience challenges with this encountered phenomena since they are not optimized for performance in such clutter.

Embodiments of the present invention may be optimized for detection of not only weather and terrain, but also infrastructure hazards to a ground or airborne entity. Cable lines pose a significant challenge to specific operators. With limited visibility, an aircraft configured with system 100 may accurately image such infrastructure using the present invention.

Figure 4:
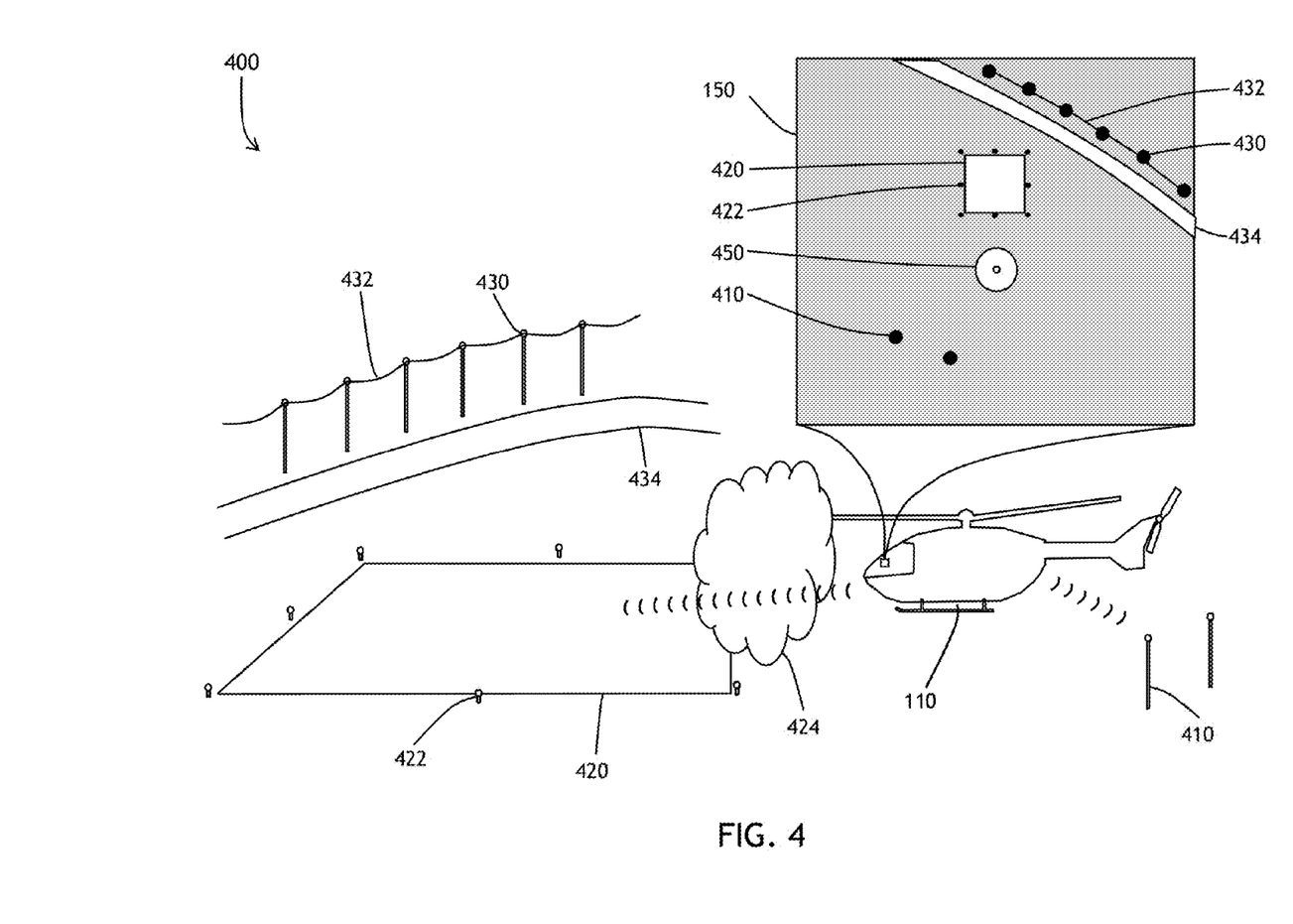
FIG. 4 is a diagram of the hybrid pulsed-FMCW multi-mode radar implemented in rotary wing low visibility landing operations in accordance with a preferred embodiment of the present invention.

Referring to FIG. 4, a diagram of the hybrid pulsed-FMCW multi-mode radar implemented in rotary wing low visibility landing operations in accordance with a preferred embodiment of the present invention is shown. Aircraft 110 may experience sandstorm 424 in a low visibility landing operation. Obstacles power line poles 430 and power line 434 may be in proximity with landing zone 420 to pose significant danger to aircraft 110. Additionally, road 434 may be close to landing zone 420 enabling possible vehicles to pose a threat to landing aircraft 110. Light poles 410 and landing zone lights 422 may also present a vertical threat to aircraft. With hybrid ESA radar configured on board aircraft 110, these threats may be successfully imaged and displayed to an operator on display 150. Display 150 may be selectable to a mode of operation where aircraft 110 is displayed at the center 450 of the display 150.

Aperture size may directly affect radar performance. In a hybrid system of the present invention, a pulsed radar performance may be enhanced using a larger aperture to enhance gain while FMCW performance may be largely unaffected by aperture size. Aperture size may be optimized for the pulsed portion of the hybrid or in some cases aperture optimization may stem from size and weight or cost considerations while the FMCW portion of the hybrid may function with less regard to aperture size.

Implementations of the hybrid system may include a fused system of at least one hybrid system of the present invention with at least one low cost purely FMCW radar to offer a more complete picture of a surrounding situation. For example, an aircraft may be configured with the hybrid system described herein, but also configured with four lightweight and low cost purely FMCW radars to image a 360 degrees in azimuth and 360 degrees in elevation. This fused system may enable an operator to display a complete picture of surrounding weather, terrain, and traffic. For example, the hybrid system may image a thunderstorm ahead of the aircraft, a first FMCW radar may image and display two wingmen abeam and behind the aircraft, an additional FMCW radar may image and display terrain behind the aircraft, and an additional FMCW radar may image and display a vehicle moving on a road below the aircraft. In this implementation, it is contemplated these fused systems may additionally enable an operator to accurately fix the position the aircraft for navigation.

Figure 5:
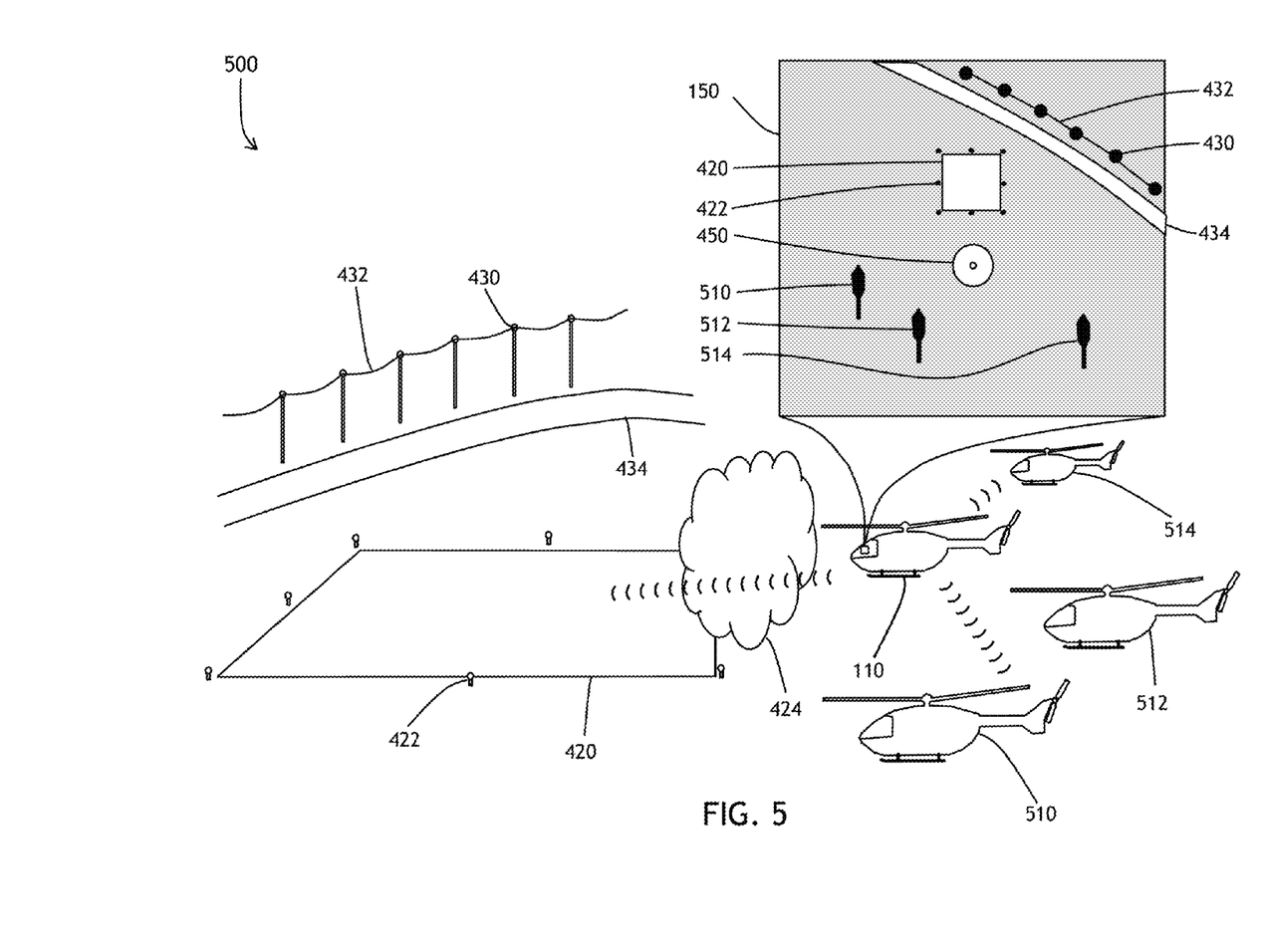
FIG. 5 is a diagram of the hybrid pulsed-FMCW multi-mode radar implemented in rotary wing formation landing operations in accordance with a preferred embodiment of the present invention.

Referring to FIG. 5, a diagram of the hybrid pulsed-FMCW multi-mode radar implemented in rotary wing formation landing operations in accordance with a preferred embodiment of the present invention is shown. This baseline system is non-cooperative. Aircraft 110 may be configured with hybrid system 100 as well as an additional low cost FMCW radar. With such a fused system installed, aircraft 100 may image not only landing zone 420 and surrounding obstacles, but also wingmen 510, 512 and 514. As above, display 150 may be selectable where aircraft 110 is displayed at the center 450. Alternatively, a cooperative system may also be implemented with embodiments of the present invention using a transponder/beacon illuminator/receiver combination for each of the aircraft, 510, 512, 514, etc. This implementation may reduce false alarms and increase detection rate all within low beam time usage.

Figure 6:
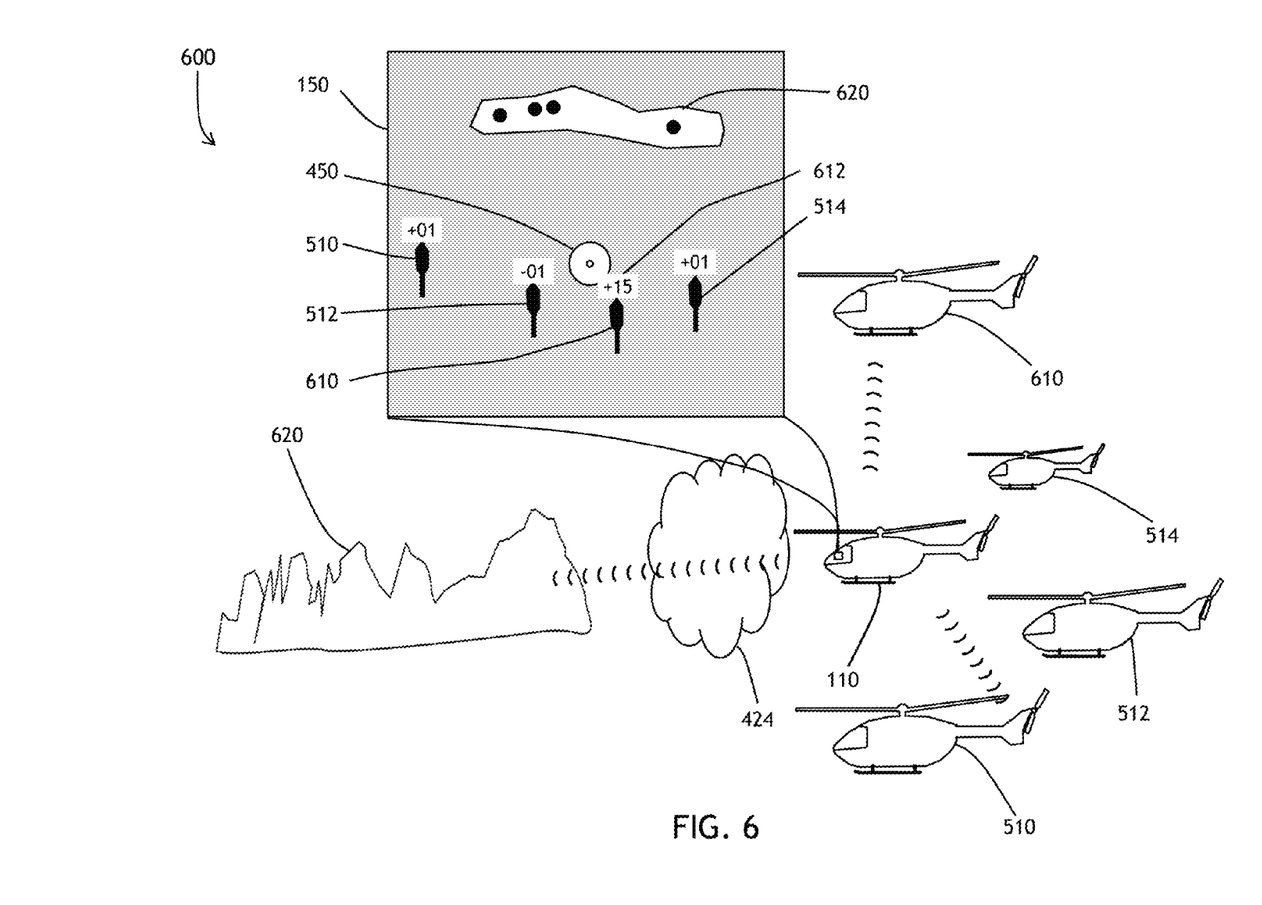
FIG. 6 is a diagram of the hybrid pulsed-FMCW multi-mode radar implemented in rotary wing terrain avoidance operations in accordance with a preferred embodiment of the present invention.

Referring to FIG. 6, a diagram of the hybrid pulsed-FMCW multi-mode radar implemented in rotary wing terrain avoidance operations in accordance with a preferred embodiment of the present invention is shown. This baseline system is non-cooperative. With the fused system installed on aircraft 110, a picture of 360 degrees in azimuth as well as 360 degrees in elevation may be displayed. Additional wingman 610 may be displayed on display 150 including a marker 612 indicating altitude deviation from aircraft 110. For example, wingman 610 may fly above and slightly behind aircraft 110. ON display 150, wingman 610 may be displayed at the five o'clock position of aircraft 110 with an altitude marker 612 of +1500 feet. Terrain 620 may be not visually observable by the operator of aircraft 110, however, terrain 620 may be indicated on display 150. As above, an alternative cooperative system may also be implemented with embodiments of the present invention using a transponder/beacon illuminator/receiver combination for each aircraft, 510, 512, 514, etc. This implementation may reduce false alarms and increase detection rate all within low beam time usage.

Figure 7:
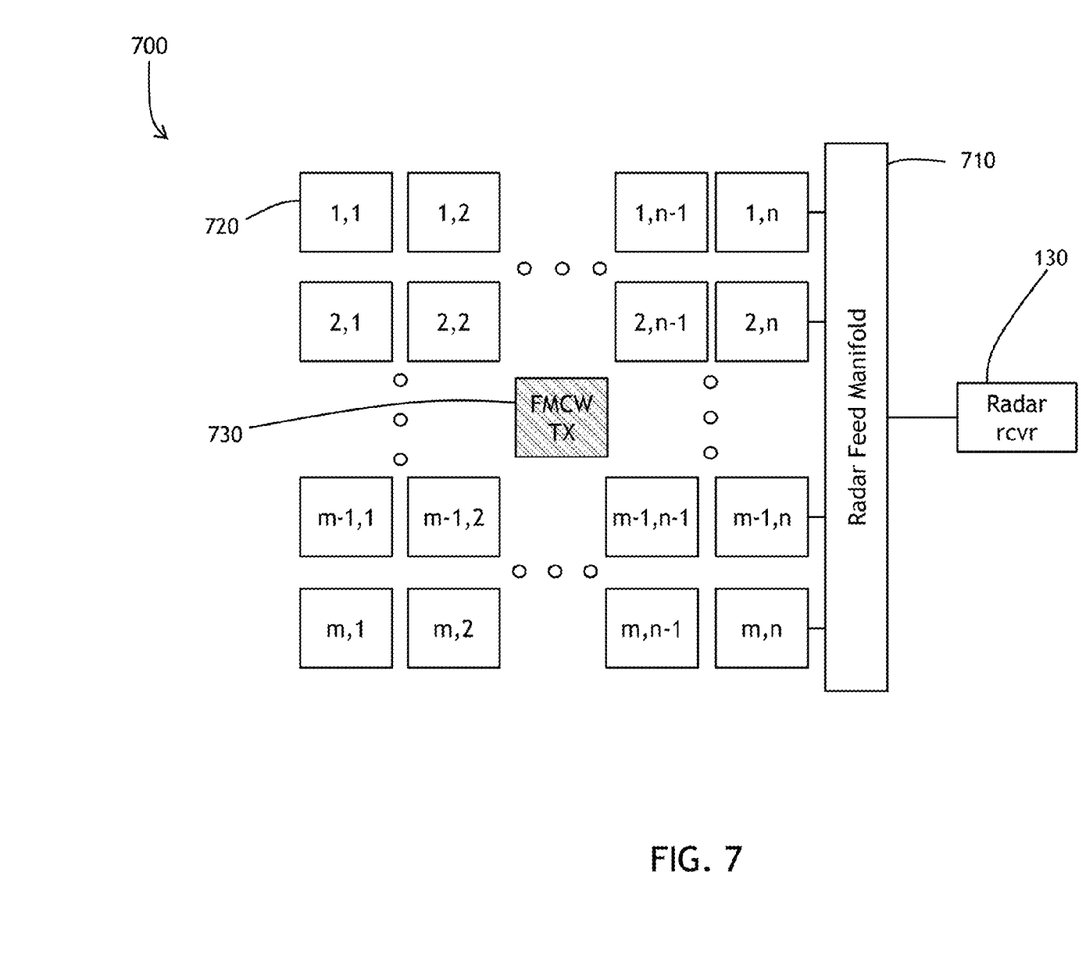
FIG. 7 is an embodiment of one configuration of pulsed and FMCW elements exemplary of a preferred embodiment of the current invention.

Referring to FIG. 7, an embodiment of one configuration of pulsed and FMCW elements exemplary of a preferred embodiment of the current invention is shown. In this embodiment, a collection of pulsed radiating elements 720 with TRM within an aperture is nested with a single FMCW transmitting element 730 in the center. In this embodiment, perturbation of the pulsed radar is minimized since only a small FMCW radiating element is located in the center of the aperture. This embodiment may present configurations tailored to specific operations. For example, this configuration may be specifically advantageous in a flight operation desiring short range imaging of weather as a priority. A common receive chain maintains adequate bandwidth for FMCW and pulsed signal receive through each of the TRM, through the radar feed manifold 710 to the radar receiver 130.

Figure 8:
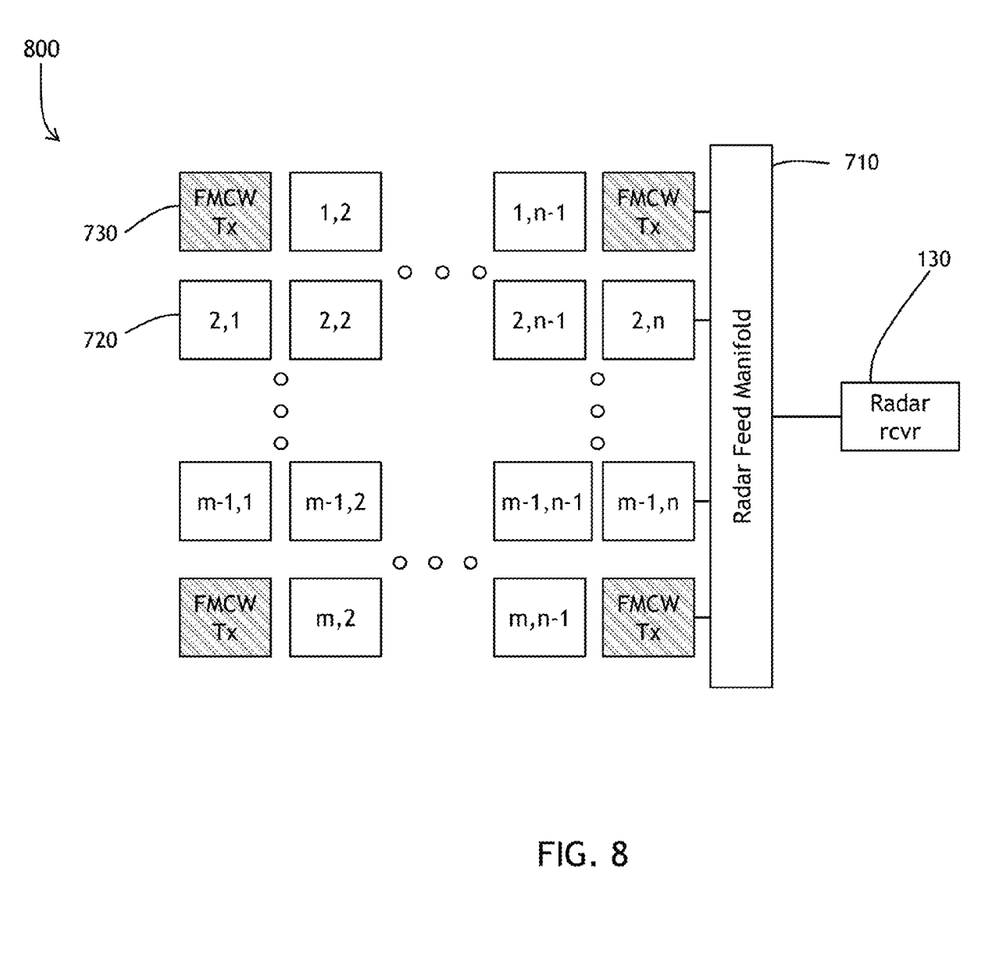
FIG. 8 is an embodiment of one configuration of pulsed and FMCW elements exemplary of a preferred embodiment of the current invention.

Referring to FIG. 8, an embodiment of one configuration of pulsed and FMCW elements exemplary of a preferred embodiment of the current invention is shown. In this embodiment, a collection 800 of pulsed radiating elements 720 is surrounded by FMCW radiating elements 730 specifically spaced in an additional level of perturbation of the pulsed radar. An operator may desire more FMCW energy on a specific expected target, thus, more FMCW TX elements 730 may be of interest. For example, an operator may desire imaging of a small RCS power line at a specific close range. An increased FMCW signal may allow for desired imaging of the close in target or threat. This configuration may place a FMCW TX 730 on each of the four corners of the array 800 or spaced at the ends of an X configuration. The FMCW transmit may be individual or may alternatively be tapped from the pulsed transmit chain. As before, the receive chain may maintain sufficient bandwidth to permit both pulsed receive and FMCW receive through the TRM 720 and within the same chain.

Although a primary goal of the configuration may include a minimum perturbation of the FMCW, this configuration may also particularly exploit the interferometrics of the FMCW portion of the radar. In addition, the configuration of pulsed TRM may be specifically spaced to produce a receive a beam width narrow enough to discriminate against grating lobes. In one embodiment, the pulsed TRM elements are spaced at one-half wavelength apart to ensure grating lobe discrimination.

Here, it may be possible to design away from ambiguous reception of grating lobes. Even though this exemplary configuration may transmit with grating lobes from the FMCW transmitters on the corners, the more densely packed TRM in the center of the array may be specifically spaced to receive only the main FMCW lobe. Although multiple grating lobes are transmitted by the perimetrically spaced FMCW elements, only the main lobe is received by the centrally spaced TRM elements.

Additionally, the parametrically mounted FMCW TX 730 may be configured for additional ESA capabilities. For example, The FMCW TX 730 elements may be optimally positioned for providing a necessary wavelength separation for phase interferometry. The pulsed radar mode used in concert with or alternatively, separate from the FMCW radar mode of operation, may provide sufficient wavelength separation for phase interferometry techniques. Alternatively the FMCW radar mode used in concert with or alternatively, separate from the pulsed radar mode of operation may provide sufficient wavelength separation for phase interferometry. Such phase interferometric techniques may be used for a plurality of capabilities including, but not limited to precision direction finding and Digital Beam Forming (DBF).

Figure 9:
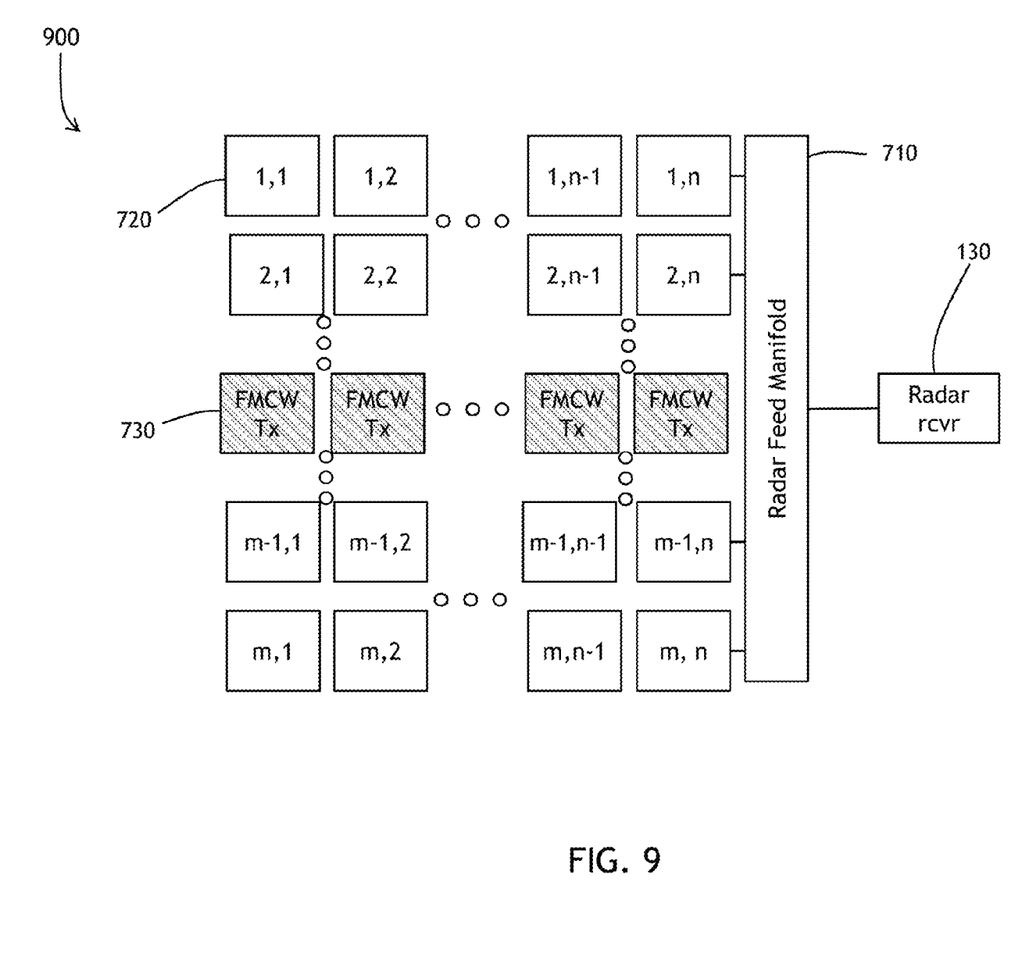
FIG. 9 is an embodiment of pulsed TRM combined with linear FMCW elements centrally placed in accordance with an alternate embodiment of the current invention.

Referring to FIG. 9, an embodiment of pulsed TRM combined with linear FMCW elements centrally placed in accordance with an alternate embodiment of the current invention is shown. This configuration of pulsed TRM 720 combined with linear FMCW elements 730 centrally placed may offer additional capabilities. In order to maintain a desired level of FMCW output, an entire row of FMCW TX elements 730 may be employed either horizontally (as shown) or vertically (not shown). FMCW may enjoy better performance in this configuration however the pulsed portion of the array may be limited to a lesser level of performance. An optimal configuration may maintain a desired tradeoff between pulsed performance and FMCW performance. This linear array nested within the pulsed aperture may provide a desired level of performance to image a specific obstacle or threat at specific range.

Figure 10:
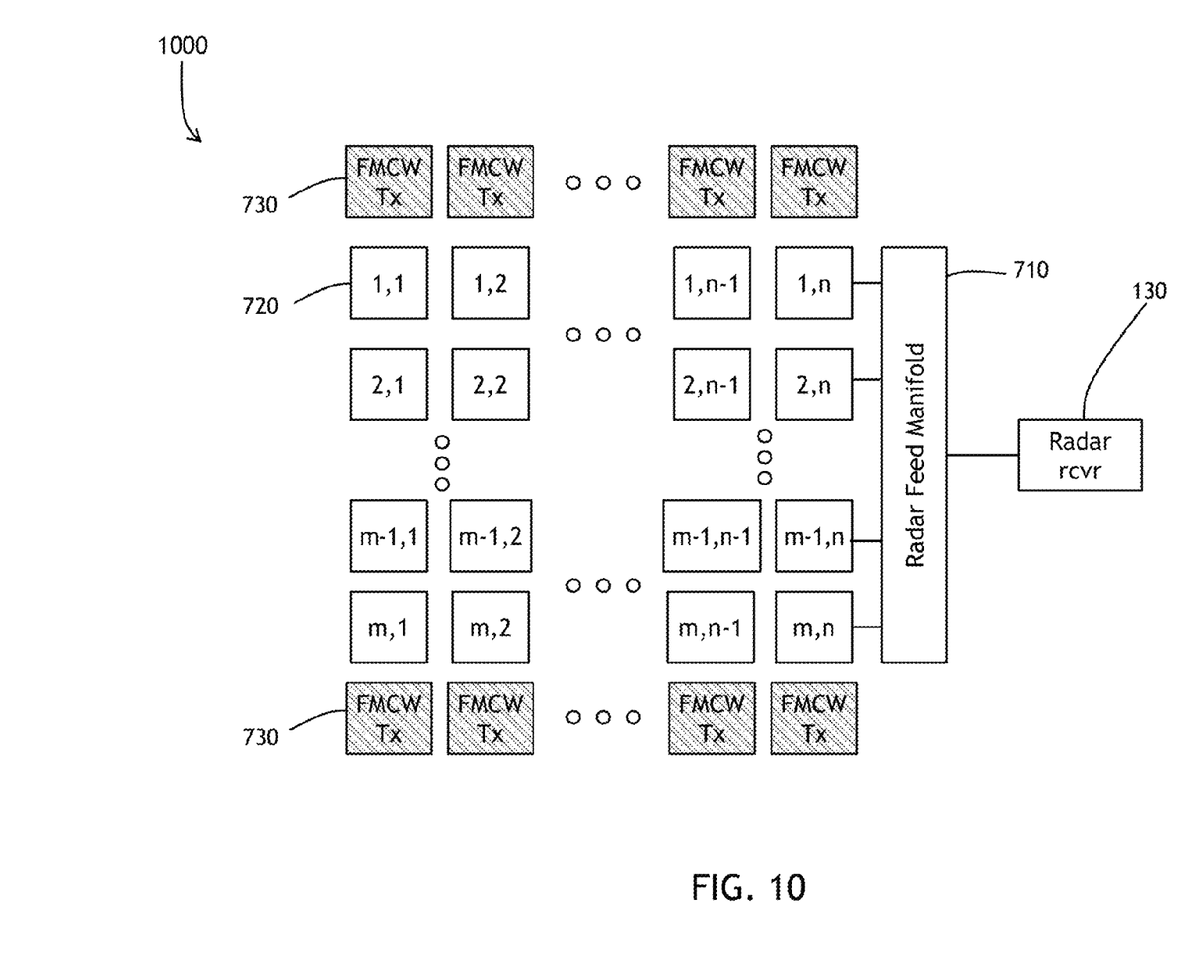
FIG. 10 is a linear array of FMCW elements oppositely placed in either rows or columns in accordance with an additional embodiment of the current invention.

Referring to FIG. 10, a linear array of FMCW elements oppositely placed in either rows or columns in accordance with an additional embodiment of the current invention is shown. A linear array of FMCW elements 730 may be located in either rows (as shown) or columns (not pictured) at opposite ends of the periphery of the array 10000. Again, the FMCW elements 730 are transmit only while the pulsed TRM 720 are transmitting pulsed signals and receiving both pulsed and FMCW signals.

It is further contemplated, TRMs disclosed herein may include a plurality of physical configurations as well as be comprised of a plurality of substances. Preferably, embodiments of the present invention may include mixed semiconductor chip sets within a Multi-Chip Module TRMs. For example, a combination of Silicon-Germanium (SiGe)/Gallium Arsenide (GaAs) chip sets, SiGe/Gallium Nitride (GaN) chip sets, and the like. Preferably, SiGe may be employed as the basic mixed signal analog/digital and RF building block and the other RIFC/Monolithic Microwave Integrated Circuit (MMIC) may act to improve specific aspects of a signal for specific performance parameters. Performance parameters contemplated herein may include: noise figure, Power Added Efficiency for a power amplifier (PA), high isolation RF T/R switches, limiters for receiver protection, and the like.

These oppositely placed FMCW TX elements 730 may also be optimally configured for interferometric capabilities of the ESA. As above, interferometric techniques may provide additional capabilities including precision direction finding and Digital Beam Forming (DBF).

Figure 11:
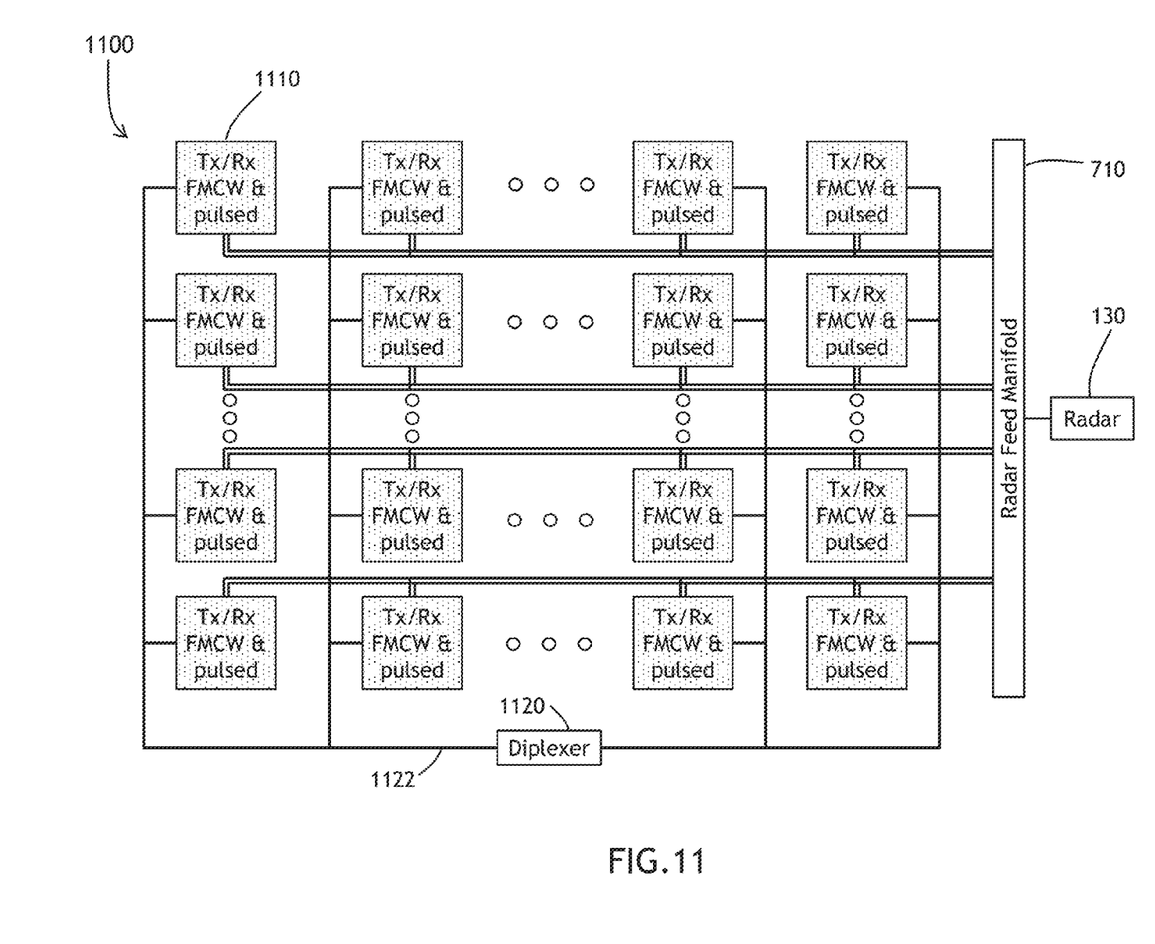
FIG. 11 is an array of diplexer switched dual mode transmit and receive pulsed and FMCW elements in accordance with an alternate embodiment of the current invention.

Referring to FIG. 11, an array of diplexer switched dual mode transmit and receive pulsed and FMCW elements in accordance with an alternate embodiment of the current invention is shown. This configuration may include a single transmit FMCW from pulsed transmit exciter chain. Simultaneous mode operation by a diplexer 1120 separating FMCW from pulsed channels. The diplexer 1120 may allow for each element 1110 the array 1100 to switch back and forth between pulsed and FMCW modes of operation. The diplexer may be operatively connected with each element 1110 in the array 1100 via a switching network 1122. As before, the pulsed receive chain maintains adequate bandwidth for FMCW receive as well as pulsed receive.

Alternatively, in place of a diplexer, embodiments of the present invention may include a FMCW radar-to-pulsed radar switch. The switch may allow for each element 1110 the array 1100 to switch back and forth between pulsed and FMCW modes of operation.

Unique to this configuration, the aperture may be fully used by both pulsed and FMCW transmit operations allowing for increased performance in both modes. System sensitivity may primarily benefit from full aperture use. Full aperture in transmit may offer a maximum amount of energy on target giving a maximum range for a given RCS target, while a full aperture in receive may offer a maximum receive sensitivity giving a minimal RCS discernible target for a given range. Alternatively, diplexing of slightly different carrier frequencies for the pulsed and FMCW modes may enable simultaneous mode operation. In addition, if there is enough frequency separation between the two systems and sufficient high selectivity performance, it is contemplated the diplexer may allow full duplex operation between FMCW and pulsed modes of operation.

Figure 12:
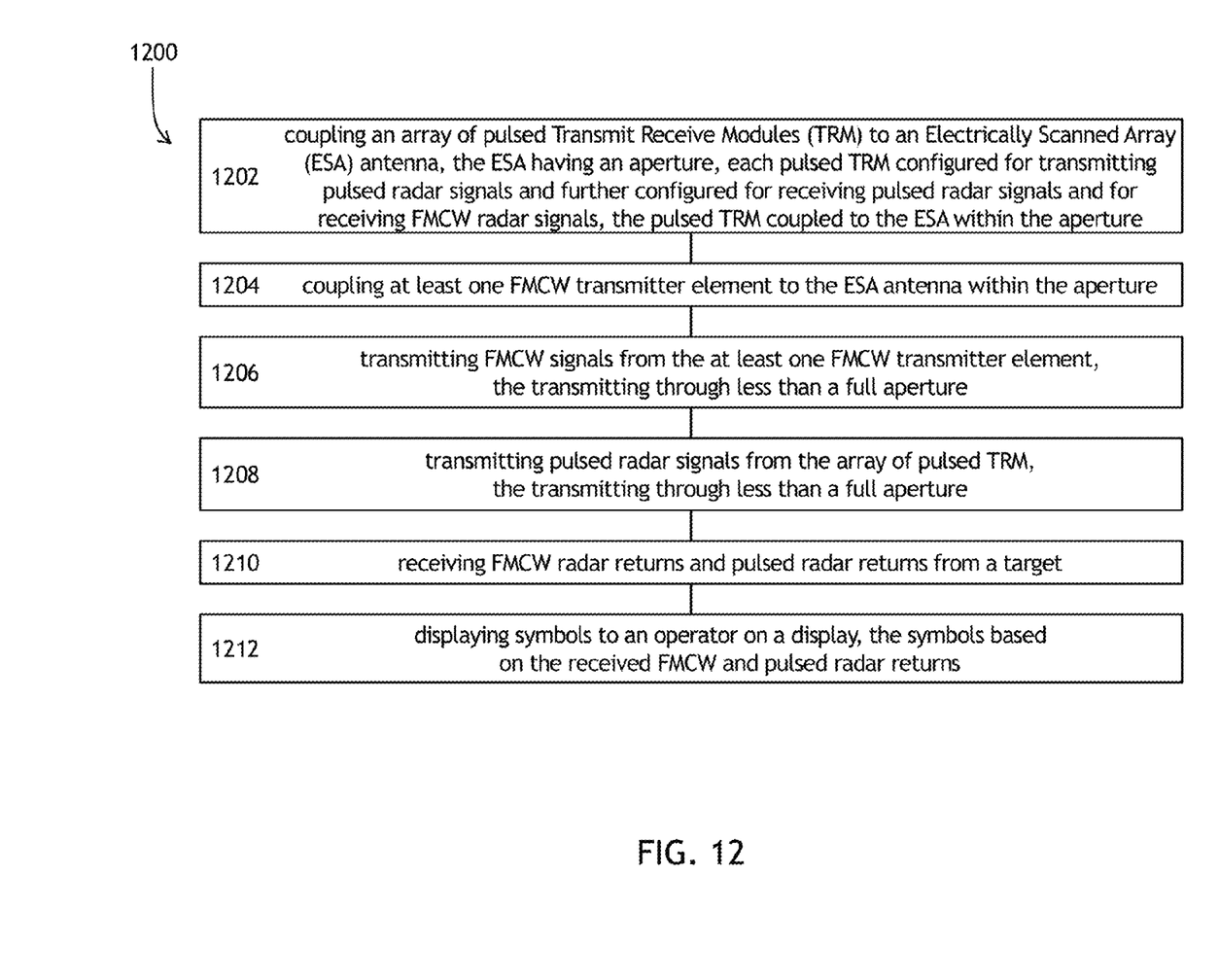
FIG. 12 is a flowchart for a method for hybrid pulsed-FMCW multi-mode airborne and rotary wing radar AESA in accordance with a preferred embodiment of the current invention.

Referring to FIG. 12, a flowchart for a method for hybrid pulsed-FMCW multi-mode airborne and rotary wing radar AESA in accordance with a preferred embodiment of the current invention is shown. Method 1200 begins at step 1202 with coupling an array of pulsed Transmit Receive Modules (TRM) to an Electronically Scanned Array (ESA) antenna, the ESA having an aperture, each pulsed TRM configured for transmitting pulsed radar signals and further configured for receiving pulsed radar signals and for receiving FMCW radar signals, the pulsed TRM coupled to the ESA within the aperture, at step 1204 coupling at least one FMCW transmitter element to the ESA antenna within the aperture, at step 1206 transmitting FMCW signals from the at least one FMCW transmitter element, the transmitting through less than a full aperture, at step 1208 transmitting pulsed radar signals from the array of pulsed TRM, the transmitting through less than a full aperture, at step 1210 receiving FMCW radar returns and pulsed radar returns from a target and, at step 1212, displaying symbols to an operator on a display, the symbols based on the received FMCW and pulsed radar returns.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A hybrid pulsed and Frequency Modulated Continuous Wave (FMCW) radar antenna device, comprising:
    an Electronically Scanned Array (ESA) antenna, the ESA having an aperture, the ESA further comprising:
        an array of pulsed Transmit Receive Modules (TRM) within the aperture, each pulsed TRM configured for transmitting pulsed radar signals and further configured for receiving pulsed radar signals and receiving FMCW radar signals;
        at least one FMCW transmitter element configured within the aperture, the FMCW transmitter configured for transmitting FMCW radar signals;
        a diplexer configured for separating a FMCW channel from a pulsed channel; and
        a switching network configured for switching each individual element between a pulsed mode and a FMCW mode;
        the ESA antenna configured for simultaneous operation in a pulsed mode and a FMCW mode;
    wherein a receive path is configured to carry received FMCW radar signals and received pulsed radar signals from each TRM to a radar receiver.

2. The hybrid pulsed and FMCW radar antenna device of claim 1, wherein the at least one FMCW transmitter element configured within the aperture further comprises a plurality of FMCW transmitter elements in a peripheral configuration wherein the FMCW elements located within the array to maximize an interferometric of the antenna.

3. The hybrid pulsed and FMCW radar antenna device of claim 1, wherein the at least one FMCW transmitter element configured within the aperture further comprises a plurality of FMCW transmitter elements in at least one of: a linear columnar configuration and linear row configuration, each column and row extending a full length of the aperture.

4. The hybrid pulsed and FMCW radar antenna device of claim 1, wherein the TRM further comprises at least one of: a silicon germanium (SiGe) Radio Frequency Radio Frequency Integrated Circuit (RFIC), and a mixed semiconductor chip set within a Multi-Chip Module TRM.

5. The hybrid pulsed and FMCW radar antenna device of claim 1, wherein the Electronically Scanned Array (ESA) antenna further comprises an Active Electronically Scanned Array (AESA).

6. The hybrid pulsed and FMCW radar antenna device of claim 1, wherein the TRM further comprises a plurality of TRM configured to support a full aperture including a capability to transmit/receive in a single beam mode and a monopulse mode.

7. The hybrid pulsed and FMCW radar antenna device of claim 1, wherein the at least one FMCW transmitter element configured within the aperture and the array of pulsed Transmit Receive Modules (TRM) are further configured to provide a necessary wavelength separation for phase-based interferometric precision direction finding.

8. The hybrid pulsed and FMCW radar antenna device of claim 1, wherein the at least one FMCW transmitter element configured within the aperture and the array of pulsed Transmit Receive Modules (TRM) are further configured to support digital beam forming (DBF).

9. A hybrid pulsed and Frequency Modulated Continuous Wave (FMCW) radar antenna device comprising:
    an Electronically Scanned Array (ESA) antenna, the ESA having an aperture, the ESA further comprising:
        an array of hybrid pulsed and FMCW elements within the aperture, each of the hybrid pulsed and FMCW elements configured for transmit and receive of a pulsed radar signal and transmit and receive of a FMCW radar signal;
        a diplexer configured for separating a FMCW channel from a pulsed channel; and
        a switching network configured for switching between a pulsed mode and a FMCW mode;
        wherein less than a full aperture is available for simultaneous pulsed and FMCW mode operation of the ESA antenna;
        wherein a full aperture is available for the hybrid pulsed and FMCW elements transmitting and receiving in either the pulsed mode or the FMCW mode.

10. The hybrid pulsed and FMCW radar antenna device of claim 9, wherein the hybrid pulsed and FMCW elements further comprise at least one of: a silicon germanium (SiGe) Radio Frequency Radio Frequency Integrated Circuit (RFIC), and a mixed semiconductor chip set within a Multi-Chip Module TRM.

11. The hybrid pulsed and FMCW radar antenna device of claim 9, wherein the Electronically Scanned Array (ESA) antenna further comprises an Active Electronically Scanned Array (AESA).

12. The hybrid pulsed and FMCW radar antenna device of claim 9, wherein the FMCW channel and the pulsed channel are dissimilar frequencies.

13. The hybrid pulsed and FMCW radar antenna device of claim 9, wherein the diplexer is further configured for alternating between a first channel and a second channel.

14. The hybrid pulsed and FMCW radar antenna device of claim 9, wherein the switching network further comprises a processor configured for commanding the switching network to transmit the transfer between the pulsed mode and the FMCW mode.

15. A method for transmission and reception of pulsed and Frequency Modulated Continuous Wave (FMCW) radar energy from and to a single antenna, comprising:
    coupling an array of pulsed Transmit Receive Modules (TRM) to an Electronically Scanned Array (ESA)

antenna, the ESA having an aperture, each pulsed TRM configured for transmitting pulsed radar signals and further configured for receiving pulsed radar signals and for receiving FMCW radar signals, the pulsed TRM coupled to the ESA within the aperture;

coupling at least one FMCW transmitter element to the ESA antenna within the aperture;

transmitting FMCW signals from the at least one FMCW transmitter element, the transmitting through less than a full aperture;

transmitting pulsed radar signals from the array of pulsed TRM, the transmitting through less than a full aperture;

diplexing each of the FMCW signals and the pulsed radar signals to enable simultaneous pulsed and FMCW mode operation of the ESA antenna;

receiving FMCW radar returns and pulsed radar returns from a target; and displaying symbols to an operator on a display, the symbols based on the received FMCW and pulsed radar returns.

16. The method of claim 15, wherein the at least one FMCW transmitter element further comprises a plurality of FMCW transmitter elements in a peripheral configuration wherein the FMCW elements located within the aperture to maximize an interferometric of the antenna.

17. The method of claim 15, wherein the at least one FMCW transmitter element further comprises a plurality of FMCW transmitter elements in at least one of: a linear columnar configuration and linear row configuration, each column and row extending a full length of the aperture.

18. The method of claim 15, wherein the TRM further comprises at least one of: a silicon germanium (SiGe) Radio Frequency Radio Frequency Integrated Circuit (RFIC), and a mixed semiconductor chip set within a Multi-Chip Module TRM.

19. The method of claim 15, wherein the Electronically Scanned Array (ESA) antenna further comprises an Active Electronically Scanned Array (AESA).

20. The method of claim 15, wherein the TRM further comprises a plurality of TRM configured to support a full aperture including a capability to transmit/receive in a single beam mode and a monopulse mode.

21. The method of claim 15, wherein receiving FMCW radar returns and pulsed radar returns from a target further comprises receiving FMCW radar returns and pulsed radar returns in the TRM.

22. The method of claim 15, wherein the target further comprises at least one of: an obstacle, an airborne vehicle, a surface vehicle, a terrain, and a weather hazard.

23. The method of claim 15, wherein the at least one FMCW transmitter element and the array of pulsed Transmit Receive Modules (TRM) are further configured to provide a necessary wavelength separation for phase-based interferometric precision direction finding.

24. The method of claim 15, wherein the at least one FMCW transmitter element and the array of pulsed Transmit Receive Modules (TRM) are further configured to support digital beam forming (DBF).

* * * * *